(12) United States Patent
Jette

(10) Patent No.: US 6,361,000 B1
(45) Date of Patent: *Mar. 26, 2002

(54) FLEXIBLE CABLE MANAGEMENT SYSTEM

(76) Inventor: Roger Jette, 17 Prospect St., Babylon, NY (US) 11702

( * ) Notice: Subject to any disclaimer, the term of this patent is extended or adjusted under 35 U.S.C. 154(b) by 0 days.

This patent is subject to a terminal disclaimer.

(21) Appl. No.: 09/629,265

(22) Filed: Jul. 31, 2000

Related U.S. Application Data

(63) Continuation of application No. PCT/US99/01913, filed on Jan. 29, 1999, which is a continuation-in-part of application No. 09/015,814, filed on Jan. 29, 1998, now Pat. No. 6,019,323, which is a continuation-in-part of application No. 08/637,390, filed on Apr. 25, 1996, now Pat. No. 5,839,702.

(51) Int. Cl.$^7$ .................................................. F16L 3/22
(52) U.S. Cl. .......................... 248/49; 248/58; 248/60; 248/65; 248/68.1; 248/302
(58) Field of Search ....................... 248/49, 68.1, 58, 248/52, 75, 76, 302, 65, 60; 174/68.1, 68.3, 72

(56) References Cited

U.S. PATENT DOCUMENTS

| | | | |
|---|---|---|---|
| 1,590,910 A | 6/1926 | Rumrill | |
| 1,787,106 A | 12/1930 | Glazener | |
| 2,082,099 A | 6/1937 | Cruser | |
| 2,620,232 A | 12/1952 | King | |
| 2,684,512 A | 7/1954 | Beman | |
| 2,687,329 A | 8/1954 | Hunter | |
| 2,891,750 A * | 6/1959 | Bergquist | ................... 248/58 |
| 3,021,102 A | 2/1962 | Kuempel | |
| 3,053,358 A | 9/1962 | Gross | |
| 3,321,571 A | 5/1967 | Lynch | |
| 3,363,048 A * | 1/1968 | Vaughn | .................... 174/72 A |
| 3,588,012 A | 6/1971 | Schaefer | |
| 3,687,406 A | 8/1972 | Krahe et al. | |
| 4,068,824 A | 1/1978 | Flynn | |
| 4,143,845 A * | 3/1979 | Harris | ..................... 248/221.2 |
| 4,156,436 A * | 5/1979 | Hawk | ....................... 248/68 X |
| 4,337,934 A | 7/1982 | Caveney | |
| 4,372,510 A * | 2/1983 | Skypala | .................... 248/49 X |
| 4,432,519 A | 2/1984 | Wright | |

(List continued on next page.)

FOREIGN PATENT DOCUMENTS

| | | | |
|---|---|---|---|
| DE | 1 540 323 | | 2/1970 |
| DE | 1615074 | * | 4/1970 |
| DE | 7120422 | * | 8/1971 |
| DE | 2155625 | * | 5/1973 |
| DE | 2358863 | * | 5/1974 |

(List continued on next page.)

*Primary Examiner*—Ramon O Ramirez
*Assistant Examiner*—Tan Le
(74) *Attorney, Agent, or Firm*—Dilworth & Barrese, LLP

(57) ABSTRACT

A cable support apparatus is provided including an elongate flexible spine member selectively bendable into a number of different configurations and a plurality of support members, at least some of the plurality of support members being attached to the elongate flexible spine member at least at two points along the length thereof, while permitting substantial bending by hand of the elongate flexible spine member. Each of the plurality of support members defines at least one area adapted to receive and support a cable therein. The cable support apparatus may include a mounting terminal that is formed adjacent a juncture between one of the plurality of support members and the elongate flexible spine member, the mounting terminal is configured and dimensioned to cooperate with hardware to facilitate mounting the cable support apparatus to a structure positioned a vertical distance away from the cable support apparatus.

9 Claims, 9 Drawing Sheets

U.S. PATENT DOCUMENTS

| | | | | |
|---|---|---|---|---|
| 4,765,576 A | * | 8/1988 | Peled | 248/49 |
| 4,840,023 A | * | 6/1989 | Borsani | 248/49 X |
| 5,123,618 A | * | 6/1992 | Guterman et al. | 248/49 |
| 5,240,209 A | | 8/1993 | Kutsch | |
| 5,323,988 A | | 6/1994 | Handler | |
| 5,524,327 A | * | 6/1996 | Mickel et al. | 248/52 X |
| 5,531,410 A | | 7/1996 | Simon | |
| 5,704,571 A | * | 1/1998 | Vargo | 248/58 |
| 5,839,702 A | * | 11/1998 | Jette | 248/49 |
| 6,019,323 A | * | 2/2000 | Jette | 248/49 |

FOREIGN PATENT DOCUMENTS

| | | |
|---|---|---|
| DE | 7435122 | * 10/1974 |
| DE | 3 742 448 | 6/1989 |
| EP | 0 298 825 | 1/1989 |
| EP | 0 553 039 | 7/1993 |
| EP | 556137 | * 10/1993 |
| EP | 0 571 307 | 11/1993 |
| FR | 2 395 449 | 1/1979 |
| WO | WO 97/40564 | * 10/1997 |

\* cited by examiner

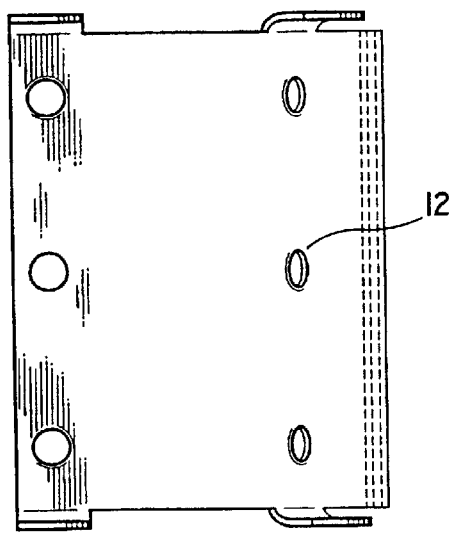
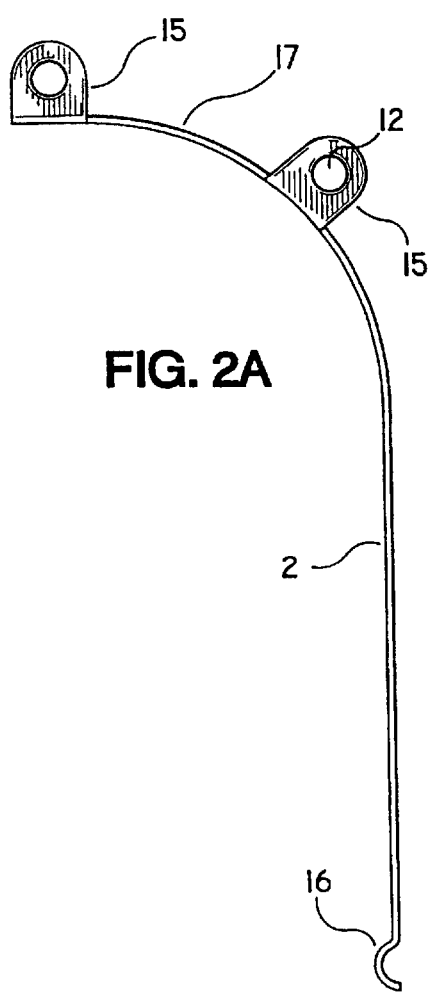
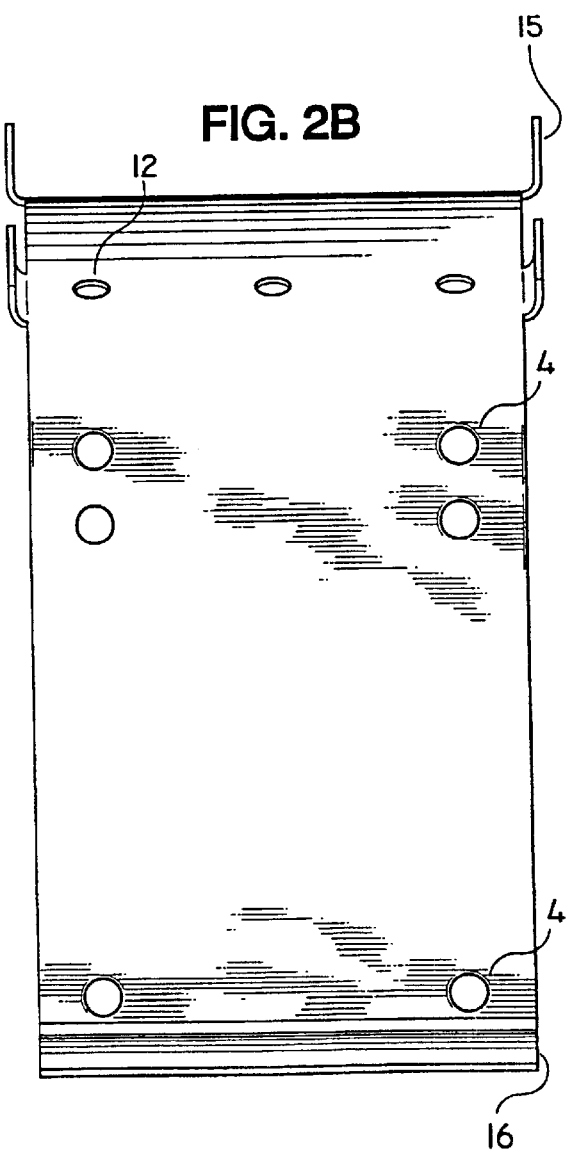

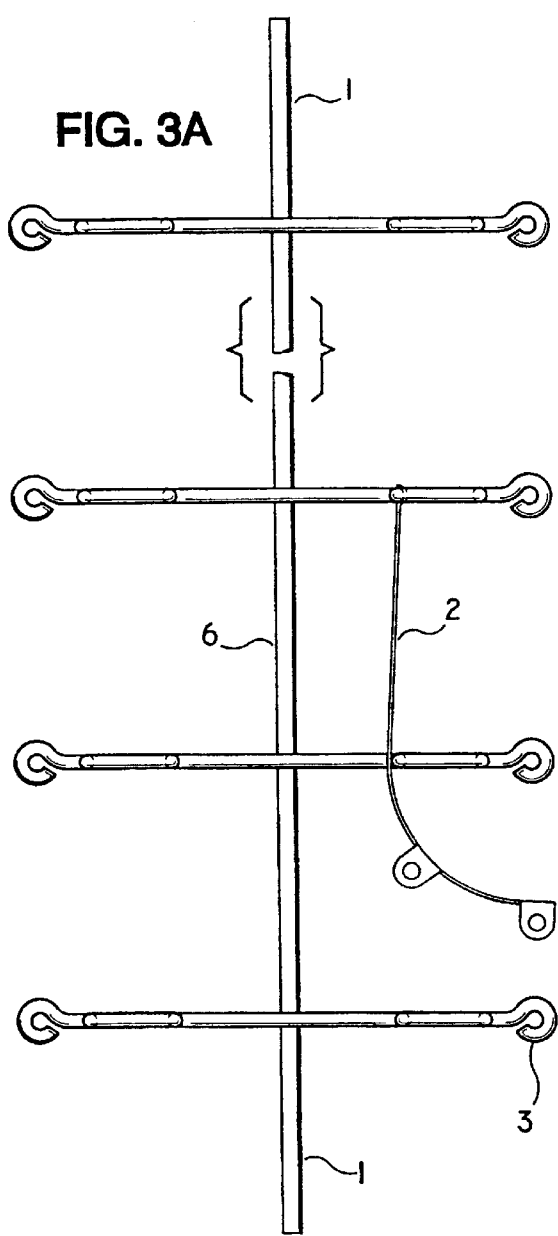
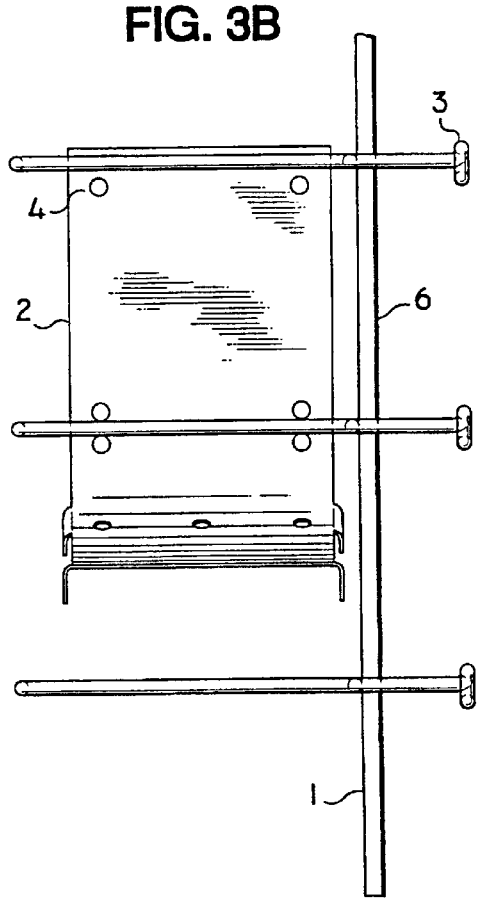
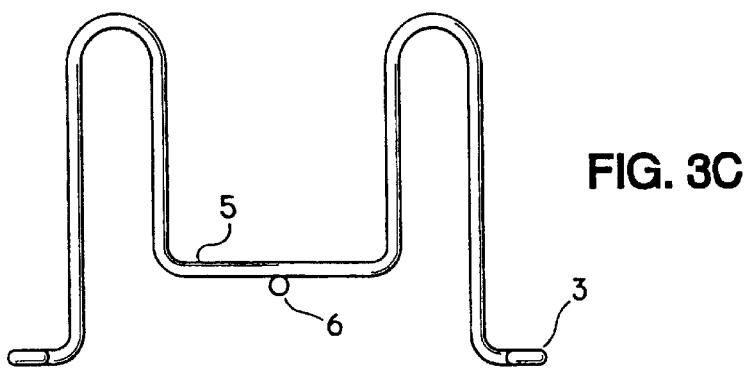
FIG. 3A
FIG. 3B
FIG. 3C

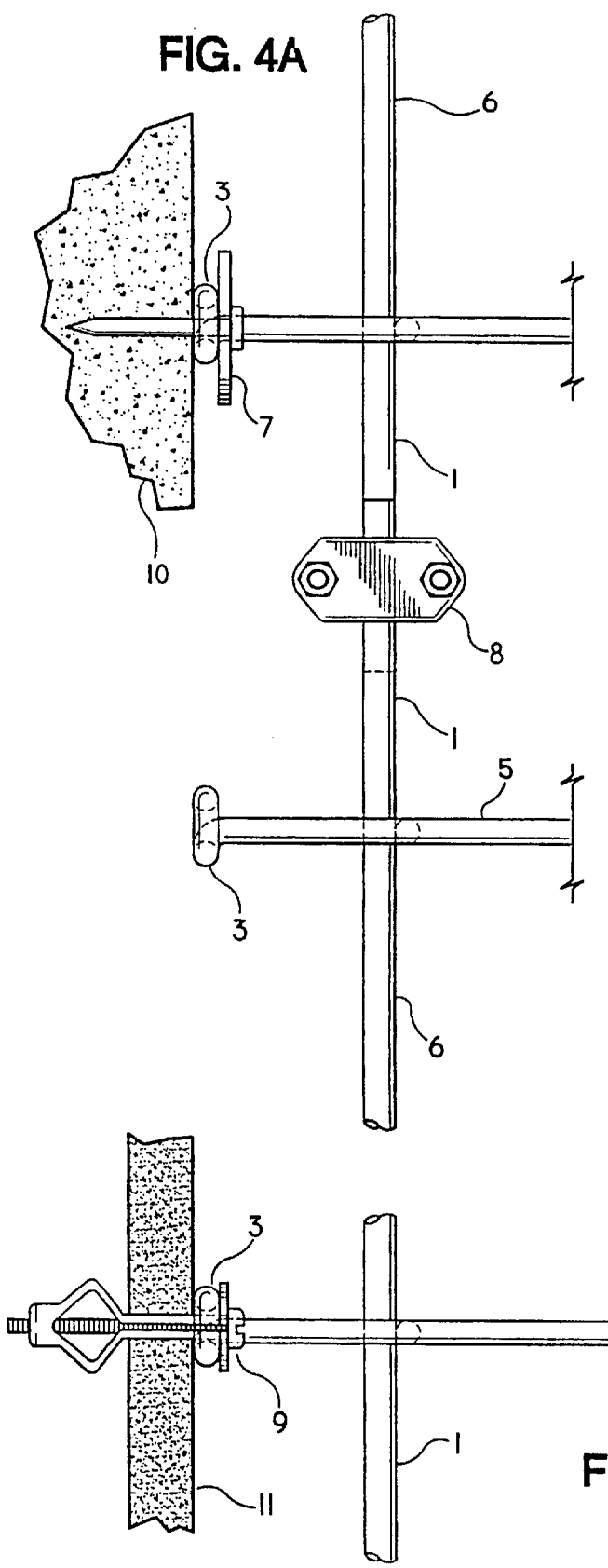
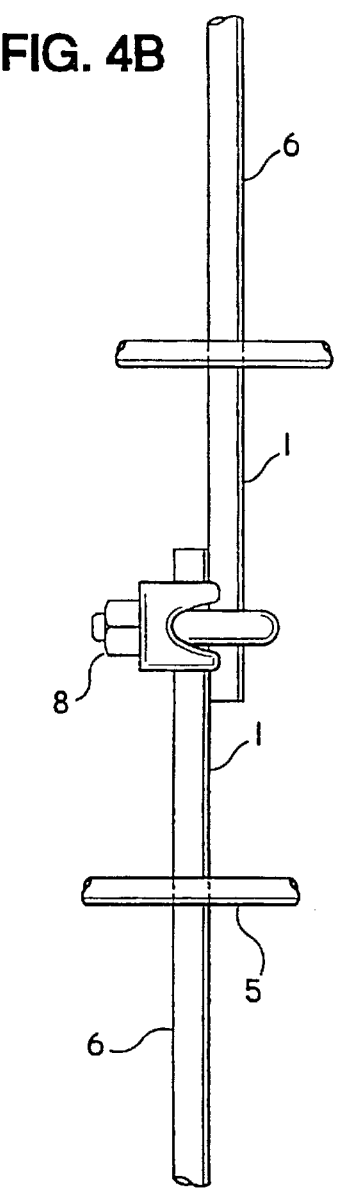
FIG. 4A
FIG. 4B
FIG. 4C

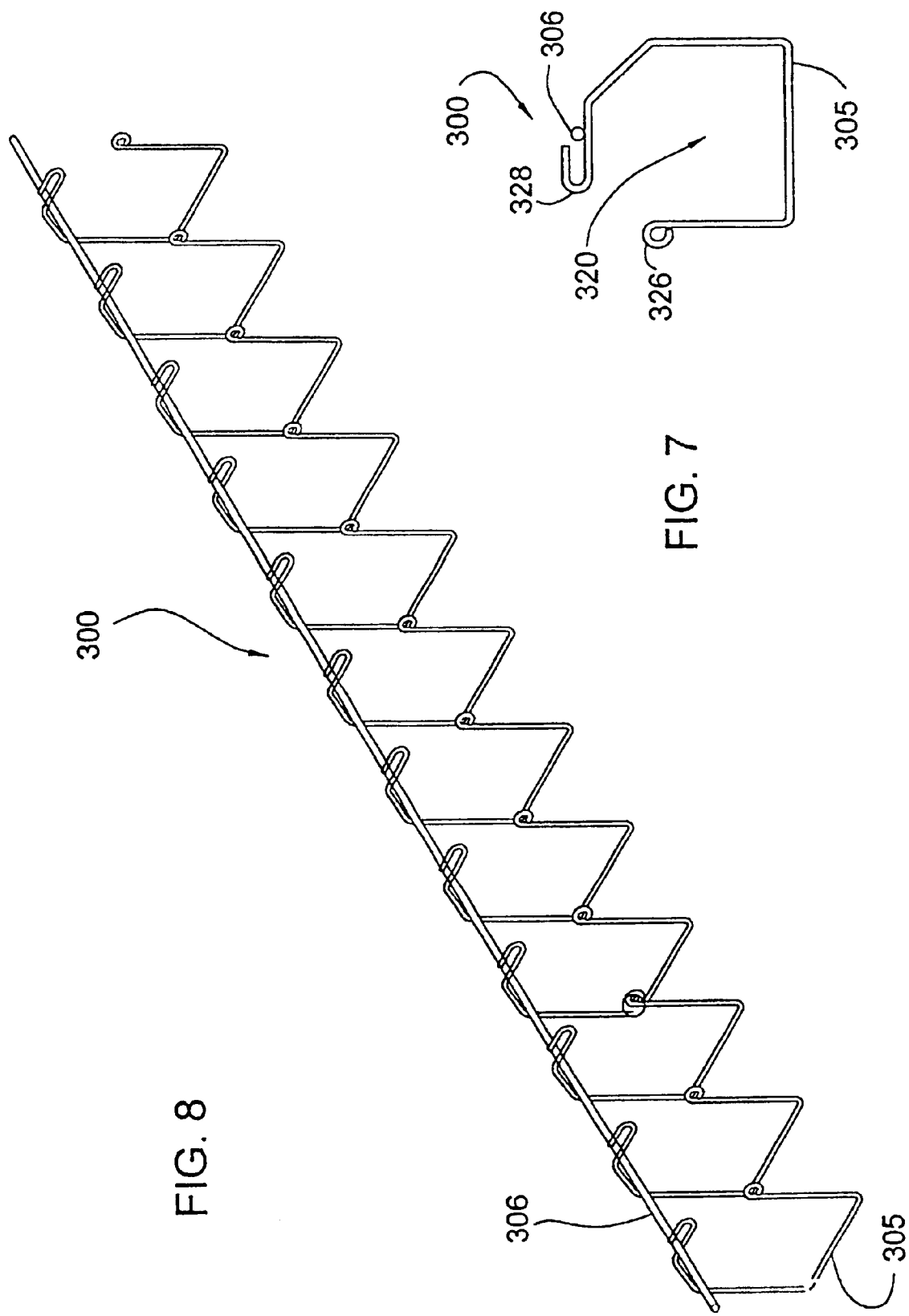

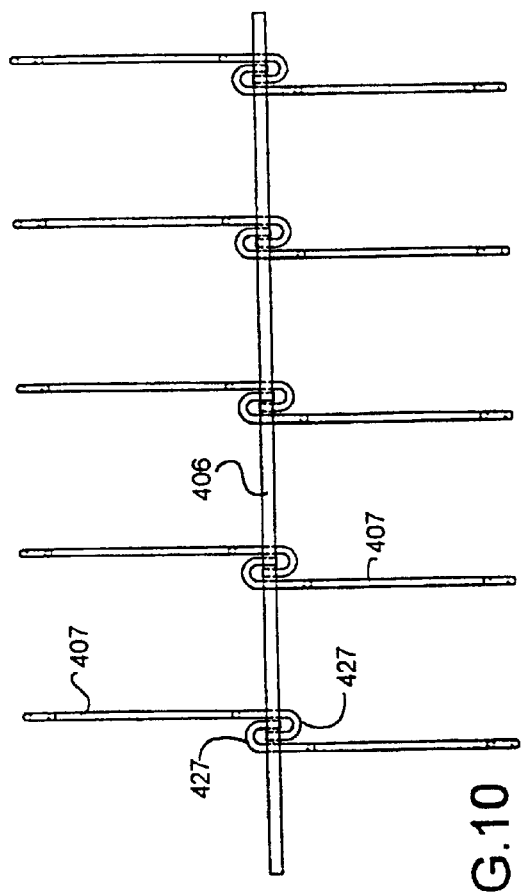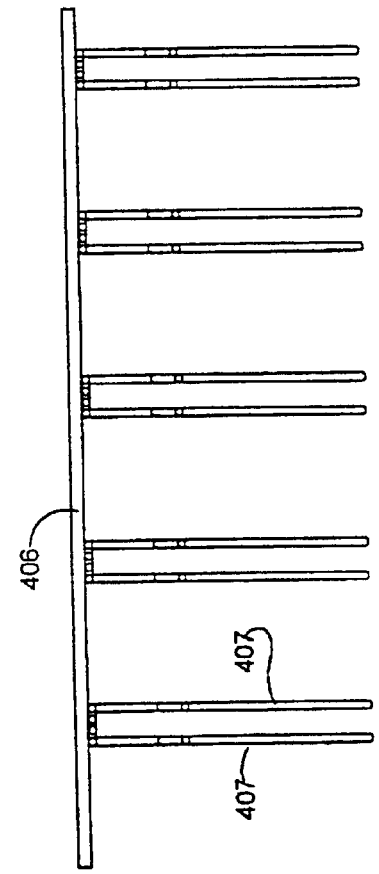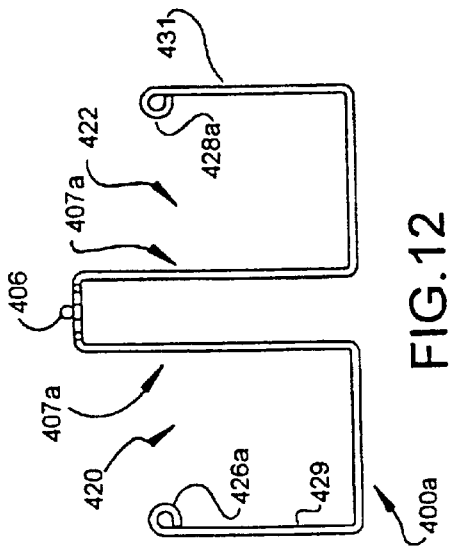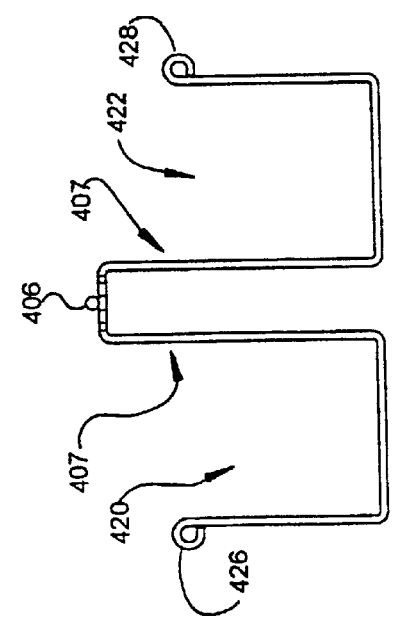

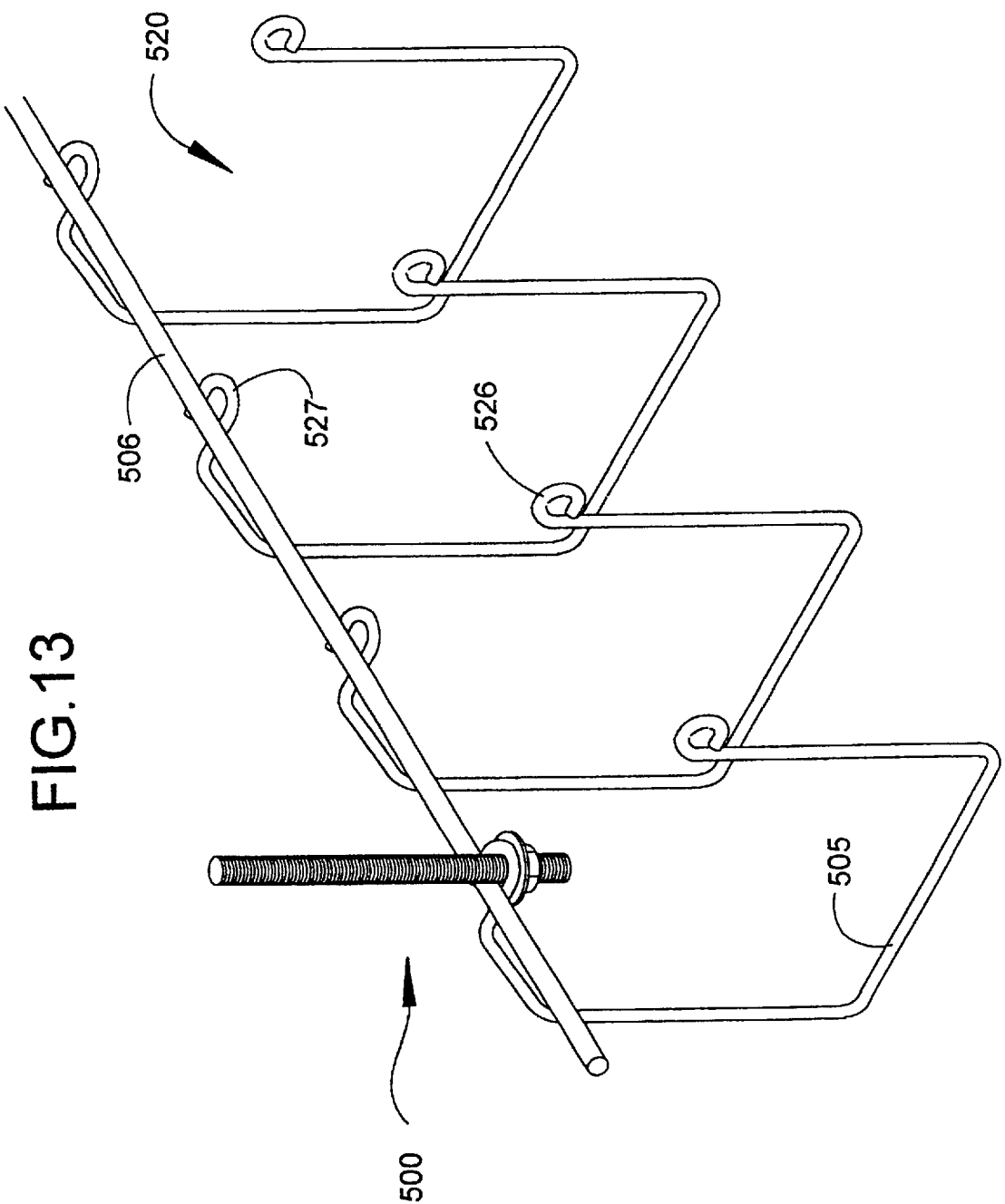

FLEXIBLE CABLE MANAGEMENT SYSTEM

CROSS REFERENCE TO RELATED APPLICATIONS

The present application is a continuation of co-pending PCT Application Serial No. PCT/US99/01913 filed on Jan. 29, 1999, which is a continuation-in-part of U.S. application Ser. No. 09/015,814 filed Jan. 29, 1998, now U.S. Pat. No. 6,019,323, which is, in turn, a continuation-in-part of U.S. application Ser. No. 08/637,390 filed Apr. 25, 1996, now U.S. Pat. No. 5,839,702, the entire contents of which are hereby incorporated by reference.

BACKGROUND

1. Technical Field

The present disclosure relates to cable management systems and more particularly to flexible cable management systems for cable management and installation applications.

2. Description of Related Art

With the increasing volume of communication and data cables being incorporated into buildings cable management systems are becoming more and more critical. Previous cable management systems utilized rigid box trays or ladders which required a high degree of labor and components to perform even a simple installation. The amount of labor and additional components significantly increased when attempting an installation which required routing the cable tray around obstacles such as ductwork, plumbing or other building systems.

Accordingly, a need exists for cable management systems which simplify the installation process and reduce the assembly of numerous different components to route the cable tray around obstacles.

SUMMARY

The presently disclosed flexible cable management system provides a greatly simplified installation, organization, routing and protection of cable. It is designed in such a way as to bend into curves in either lateral or vertical directions without tools, heat, fixtures or chemical alterations and as such is different from any other product. It therefore eliminates the need to procure and to install turning components and transitions. The design of the presently disclosed cable management system with multiple fastener points, allows for single person installation. This will create significant savings in person hours for the design and installation of the invention in user installations.

In one embodiment, the presently disclosed cable management system provides a cable support apparatus having an elongate flexible spine member selectively bendable into a number of different configurations and a plurality of support members, at least some of the plurality of support members being attached to the elongate flexible spine member at least at two points along the length thereof, while permitting substantial bending by hand of the elongate flexible spine member. Each of the plurality of support members defines at least one area adapted to receive and support a cable therein.

The cable support apparatus may include a mounting terminal that is formed adjacent a juncture between one of the plurality of support members and the elongate flexible spine member, the mounting terminal is configured and dimensioned to cooperate with hardware to facilitate mounting the cable support apparatus to a structure positioned a vertical distance away from the cable support apparatus.

In one alternative embodiment, at least some of the plurality of support members define two partially enclosed areas disposed below the flexible spine member and being configured and dimensioned to receive a plurality of cables therein. The flexible spine member may be positioned along a plane located centrally between the two partially enclosed areas.

The plurality of support members each preferably defines an opening in communication with the at least one area for receiving cables. The opening is disposed a vertical distance away from the flexible spine member to permit loading or unloading of cables on the cable support apparatus when the cable support apparatus is mounted relative to a base.

In another aspect of the cable support apparatus the plurality of support members are attached to the flexible spine member such that the flexible spine member is maintained at a predetermined distance away from the at least one area of each of the plurality of support members.

In one embodiment, the flexible spine member is disposed substantially vertically aligned with the center of gravity of the cable support apparatus.

In another embodiment a cable support apparatus is provided, which includes an elongate flexible spine member selectively bendable into a number of different configurations, and a plurality of support members attached to the elongate flexible spine member along the length thereof The plurality of support members are positioned relative one another to permit substantial bending by hand of the elongate flexible spine member. Further, the plurality of support members each define a partially enclosed area configured and dimensioned to receive a plurality of cables therein. Additionally, a mounting terminal is formed adjacent a juncture between at least one of the plurality of support members and the elongate flexible spine member. The mounting terminal is configured and dimensioned to cooperate with hardware so as to facilitate mounting the cable support apparatus to a structure positioned above the cable support apparatus.

BRIEF DESCRIPTION OF THE DRAWINGS:

For a better understanding of the invention, reference is made to the following description of exemplary embodiments thereof, and to the accompanying drawing figures, wherein:

FIG. 2A is an end view of an enter/exit component;

FIG. 2B is a side view of an enter/exit component;

FIG. 2C is a top view of an enter/exit component;

FIG. 3A is a top view of a flexible spine and a plurality of spoke members;

FIG. 3B is a side view of a spoke member;

FIG. 3C is a side view of a flexible spine member having spoke members and enter/exit component installed thereon;

FIG. 4A is a side view of a flexible cable management system fastened to concrete;

FIG. 4B is a side view of a flexible cable management system fastened to wallboard;

FIG. 4C is a side view of two support sections connected by means of a mechanical clamp;

FIG. 7 is an end view of a further alternative embodiment of the presently disclosed cable management system;

FIG. 8 is a perspective view of the cable management system embodiment of FIG. 7;

FIG. 9 is an end view of a further alternative embodiment of the presently disclosed cable management system;

FIG. 10 is a top view of the embodiment of FIG. 9;

FIG. 11 is a side view of the embodiment of FIG. 9;

FIG. 12 is an end view of an alternative configuration of the embodiment of FIG. 9;

FIG. 13 is a perspective view of a further alternative embodiment of the presently disclosed cable management system;

DETAILED DESCRIPTION OF PREFERRED EMBODIMENTS

Figure 1:
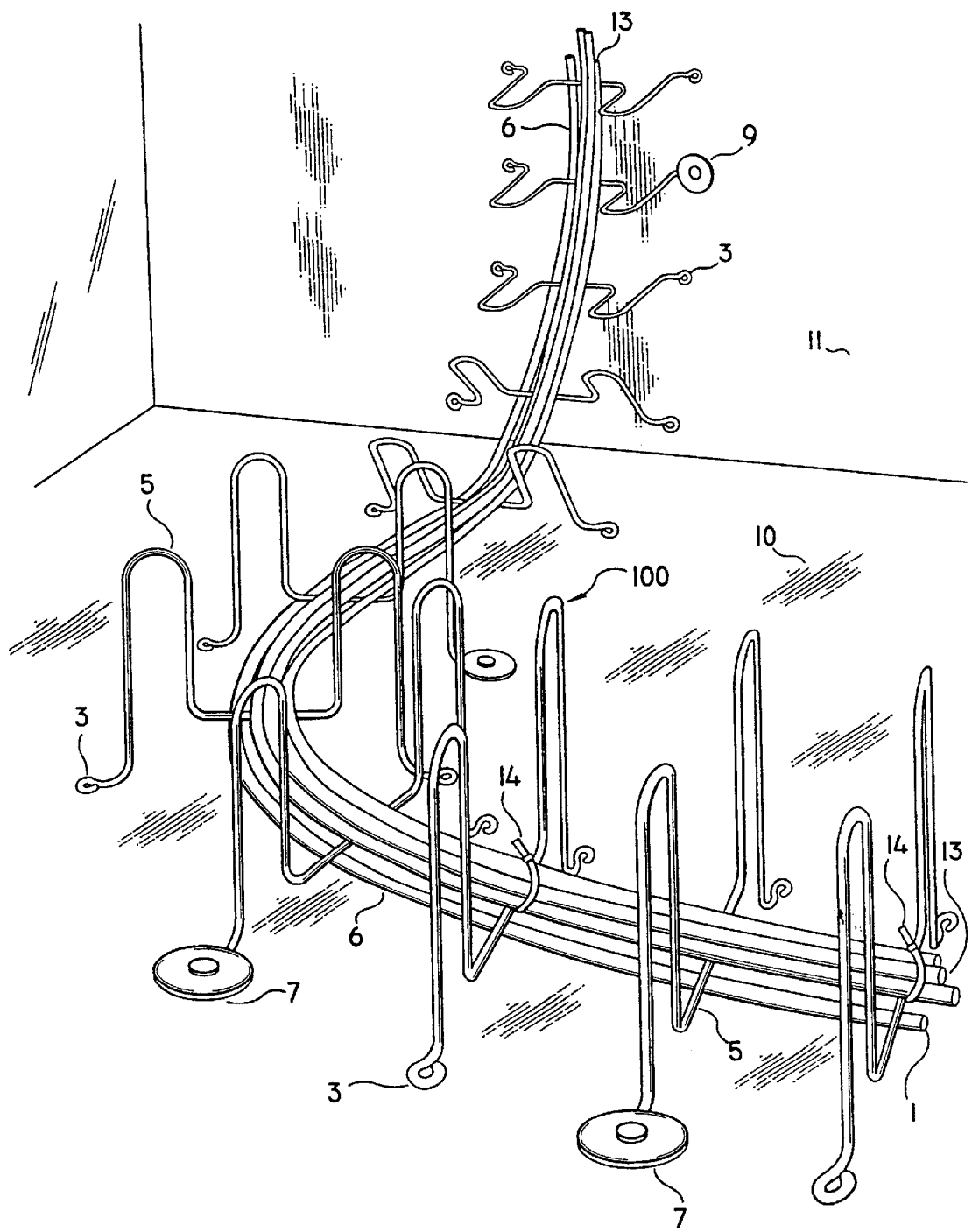
FIG. 1 is a perspective view of the flexible cable management system in accordance with the present invention.

Referring to the drawings in detail, and initially to FIG. 1, the presently disclosed flexible cable management system 100 is shown having both lateral and vertical bends formed therein. Such bends can be formed without the use of tools or other devices. Multiple fastener points 3 allow the flexible cable management system 100 to be secured in whatever position it has been bent, by means of a washered fastener 7 to a concrete surface 10 or a wall board anchor 9 to a wall board surface 11. A plurality of cables 13 are installed within the flexible cable management system and are capable of being secured to any of a plurality of cable support members such as spokes 5 with a standard cable fastener 14. Sections of flexible cable management system 100 can be joined together at a connector tail 1.

Referring now to FIGS. 2A, 2B and 2C, an enter/exit component 2 is illustrated in the three views. The enter/exit component 2 is indexed to the flexible cable management system 100 by means of a spoke index and secured by wire ties passed through attachment holes 4. A cable may be secured to enter/exit component 2 by means of wire ties passed through wire tie attachment holes 12 and further held in place by means of cable containment tabs 15. A cable radius 17 is formed in enter/exit component 2 to preclude the installed cable from bending too tightly or kinking.

In FIGS. 3A, 3B and 3C, a flexible spine 6, spokes 5 and enter/exit component 2 are shown in their assembled positions.

Referring now to FIGS. 4A, 4B and 4C, various means for attaching the flexible cable management system 100 are illustrated. In FIG. 4A, flexible cable management system 100 is shown anchored to a concrete surface 10 at fastening point 3 by means of washered fastener 7. In FIG. 4B, flexible cable management system 100 is anchored to a wall board 11 at a fastener point 3 by means of a wall board fastener 9. Two support sections are shown joined together at connector tails 1 by means of a standard clamp 8, in FIG. 4B.

The flexible cable management system 100 includes a series of formed wire spokes 5 welded to a single spine 6. The wire spokes 5 are formed in a fashion to allow the maneuvering and protection of the cables 13 that are installed in the system. Having a single spine allows the flexible cable management system 100 to be bent by hand in any direction necessary. Each spoke 5 has two fastener points 3 which allow the flexible cable management system 100 to be secured to the installation surface at multiple points along its length. Preformed proprietary enter/exit components 2 attach to spokes 5 of the flexible cable management system 100 at any point allowing the cable 13 to exit the flexible cable management system 100 without the risk of damage due to kinking. Flexible cable management system 100 is designed in such a way that it can be installed beneath raised floor, on existing floors, on walls and risers or suspended from a ceiling.

During installation, the technician will lay out the path of the cable runs on the primary floor of an installation area between the stantions of the raised floor. The technician would then place eight foot sections of the flexible cable management system 100 on the layout lines, bending by hand where necessary either laterally, up a wall or down a riser. Then, using a standard power charged stud gun and washered fasteners, randomly secure the flexible cable management system 100 to the installation area floor by means of the built in fastener rings. Anti-kink enter/exit components 2 would be installed on spokes 5 of the flexible cable management system 100 where it is necessary for cables 13 to exit the system to reach their destination. After the network of flexible cable management system 100 is completed, the technician would place copper and/or fiber optic cable into flexible cable management system 100 and randomly secure it using cable ties, to spokes 5 of flexible cable management system 100. Flexible cable management system 100 allows cable to be organized, routed and protected against crushing or kinking.

Figures 5, 6:
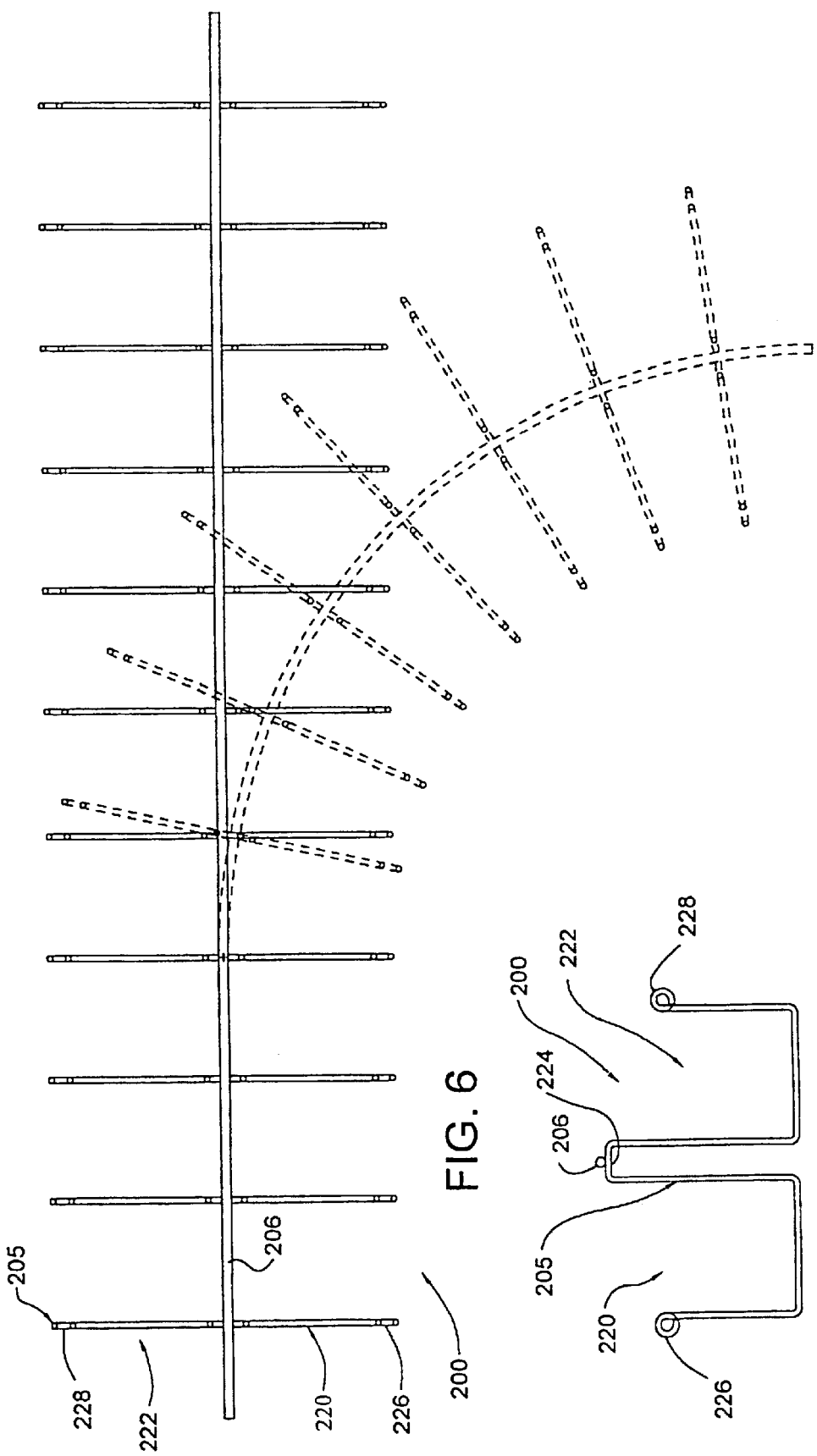
FIG. 5 is an end view of an alternative embodiment of the presently disclosed cable management system.
FIG. 6 is a top view of the embodiment of FIG. 5, which shows the flexibility of the cable management system.

Referring to FIGS. 5 and 6, an alternative embodiment of the cable management system of the present disclosure is shown generally as flexible cable tray 200. Many of the overall characteristics of cable management system 100 are also featured in cable tray 200. Accordingly, the following description will focus mainly on the unique structural and functional aspects of cable tray 200. It is within the scope of the present disclosure, however, that the assembly, connection and fastening features described above in connection with cable management system 100 may apply to cable tray 200 as well.

Cable tray 200 is particularly suited for use in installations wherein it is desirable or even necessary to route cable bundles overhead. The prior practice in some installations of simply laying cable on the top of suspended ceiling gridwork now violates electrical code requirements for many locations. Further, cabling such as fiber optic or copper data transmission cable is subject to signal attenuation due to damage, no matter how slight, which may often be the result of the cable being haphazardly positioned along the top of ceiling grid structure and thus exposed to such damage. Cable tray 200 provides a novel way of suspending cable bundles from the framework of the building structure itself, for example by bracketing the tray to studs or the like.

Similar to cable management system 100, cable tray 200 is preferably constructed of wire stock and includes a flexible spine 206 which runs centrally along the length of cable tray 200. This configuration provides the maximum flexibility for cable tray 200 and, therefore maximum versatility during installation. A dual opening cable support member 205 is formed by bending the wire stock to form cable receiving portions 220 and 222 disposed one on either side of central spine 206. The two receiving portions may be defined by a single piece of wire stock which is bent to form a web section 224. Central spine 206 may be attached to web portion 224 either transversely along the top thereof, as shown in FIG. 5, or the bottom thereof, by any suitable known methods, for example, welding.

The central location of spine 206 facilitates the self balancing feature of cable tray 200. In particular, once cable tray 200 is installed, cable is preferably loaded evenly into each of receiving portions 220 and 222 to effectuate a balanced load in cable tray 200. Looped ends 226 and 228 are provided on cable support 205 to reduce the likelihood of inadvertent damage due to contact of cables with rough edges during installation.

As shown in phantom lines in FIG. 6, cable tray 200 may be flexed significantly to either side, to effectuate at least about a 90 degree or even greater turn of cable tray 200 without individual cable support sections 205 making contact with each other. Similarly, cable tray 200 may transition from a horizontal run to a vertical run.

Referring to FIGS. 7 and 8, a further alternative embodiment constructed in accordance with the present disclosure is shown generally as cable tray 300. Cable tray 300 features partially enclosed cable receiving portion 320. Spine 306 is attached to cable support members 305 transversely along a top segment thereof in similar manner as set forth above for cable tray 200 and cable management system 100. Spine 306 is attached to cable supports 305 substantially directly over the center of gravity of the unit as a whole. In this manner, when cable tray 300 is loaded with cable evenly within receiving portion 320, there will not be any undesirable torque applied to spine 306 which is preferably attached to the building structure by suitable brackets or the like. End portions 326 and 328 are formed to bend away from the opening into receiving portion 320 to minimize the chance of even the slightest amount of damage to the cabling being placed in the receiving portion 320.

Referring to FIGS. 9 through 11, a further alternative embodiment of the cable management system of the present disclosure is shown generally as flexible cable tray 400. Cable tray 400 is similar in many aspects to cable management systems 100 and 200 described above. Accordingly, the following description will focus on the unique structural and functional aspects of cable tray 400. It is within the scope of the present disclosure, however, that the assembly, connection and fastening features described above in connection with cable management system embodiments 100 and 200 may apply to cable tray 400 as well.

Similar to cable management system embodiments 100 and 200, cable tray 400 is preferably constructed of wire stock and includes a flexible spine 406 which runs centrally along the length of cable tray 400. Cable support members 407 are formed by bending the wire stock to form cable receiving portions 420 and 422. Cable support members 407 are attached in pairs, one on either side of central spine 406. As illustrated in FIGS. 9–11, the two receiving portions 420 and 422 are defined by forming two separate lengths of wire stock by bending them into the configuration of the cable receiving and holding areas, e.g., the open ended rectangular areas illustrated in FIG. 9. It is understood, however, that other geometric configurations may also be utilized.

Mounting loops 427, FIG. 10, are formed as u-shaped horizontal terminal ends at the upper terminus of the respective inboard vertical leg of receiving portions 420 and 422 of adjacent cable support members 407. Mounting loops 427 are preferably nested, as best shown in FIG. 10, when cable support sections 407 are attached to spine 406 in a side by side relationship. In this manner, cable tray 400 retains sufficient flexibility so as to be bent by hand for the particular curvature required by the installation. As noted above for previous embodiments, the spine 406 may be attached either transversely along the top of mounting loops 427, as shown in FIG. 9, or the bottom thereof, by any suitable known methods, for example, welding. In this manner, a double attachment point is established for each cable support member 407 with respect to flexible central spine 406; thereby greatly reducing moment forces which could otherwise potentially be created in the longitudinal direction of spine 406 at the connection and providing greater stability and strength for each connection.

Alternatively, side by side support members 407 may be formed from a single piece of wire stock bent to form an "s" shaped configuration such that three attachment points are formed between the cable support member and the spine.

Mounting loops 427 are configured and dimensioned to receive mounting hardware, for example, a threaded bolt and nut combination (see FIG. 13). This eliminates the need for additional separate mounting brackets or the like which would otherwise have to be attached to cable tray 400 in order to mount it to the overhead structure of the building.

As with cable tray 200, the central location of spine 406 facilitates the self balancing feature of cable tray 400. Looped ends 426 and 428 are provided on cable support 407 to reduce the likelihood of inadvertent damage due to contact of cables with rough edges during installation. FIG. 12, however, illustrates an alternative configuration of cable tray 400, designated as cable tray 400a, wherein the looped ends are formed with an inwardly directed bend illustrated by looped ends 426a and 428a. In this configuration, looped ends 426a and 428a are preferably formed such that the gaps formed by looped ends 426a and 428a with vertical portions 429 and 431, respectively, are sufficiently narrow that the individual cables (not shown) coming in contact with looped ends are not damaged. An advantageous feature of this configuration is that cables positioned in cable tray 400a are less likely to be inadvertently moved out of the tray. This is particularly beneficial when cable bundles are being pulled through the tray, especially when being pulled around curved sections where there may be a tendency for the cables to rise near the opening.

Referring to FIG. 13, a further alternative embodiment of the cable management system of the present disclosure is shown generally as flexible cable tray 500. Cable tray 500 is similar to the embodiment shown and described in FIGS. 7 and 8 for cable tray 300 except that mounting loops 527 are formed as described above for mounting loops 427 of cable tray 400 to provide two attachment points for cable supports 505 to spine 506. Additionally, looped ends 526 formed on the outboard vertical leg of cable supports 505, shown formed outwardly in FIG. 13, may be reversed and formed as described above for the embodiment of cable tray 400 in order to provide the retention feature previously described.

Figure 14:
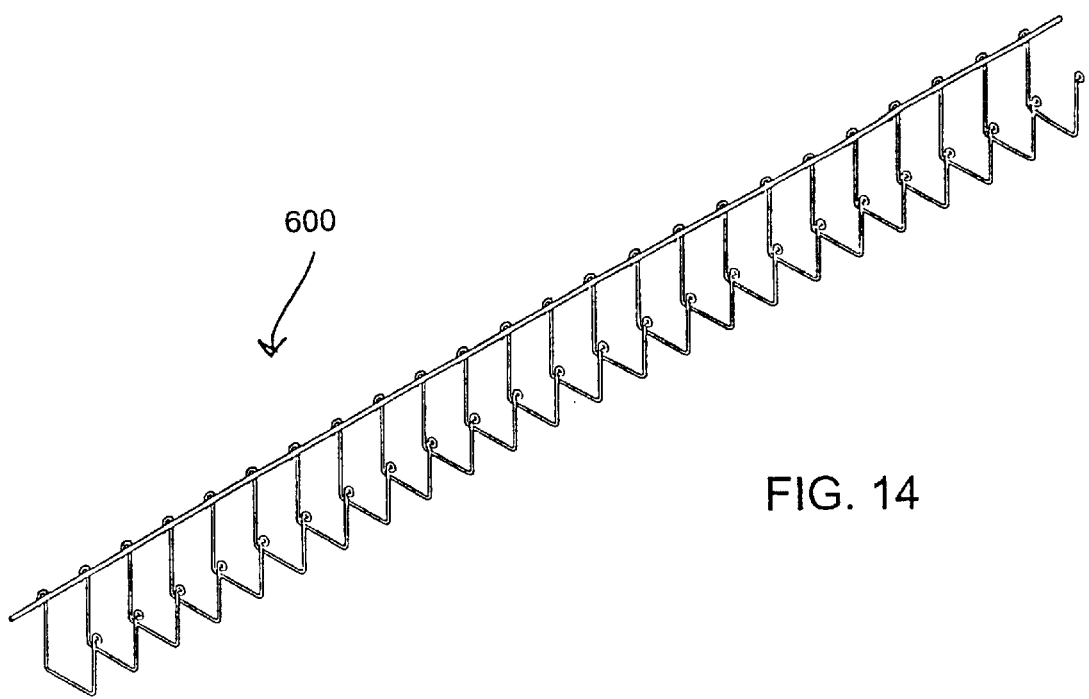
FIG. 14 is a perspective view of a further alternative embodiment of the presently disclosed cable management system.
Figure 15:
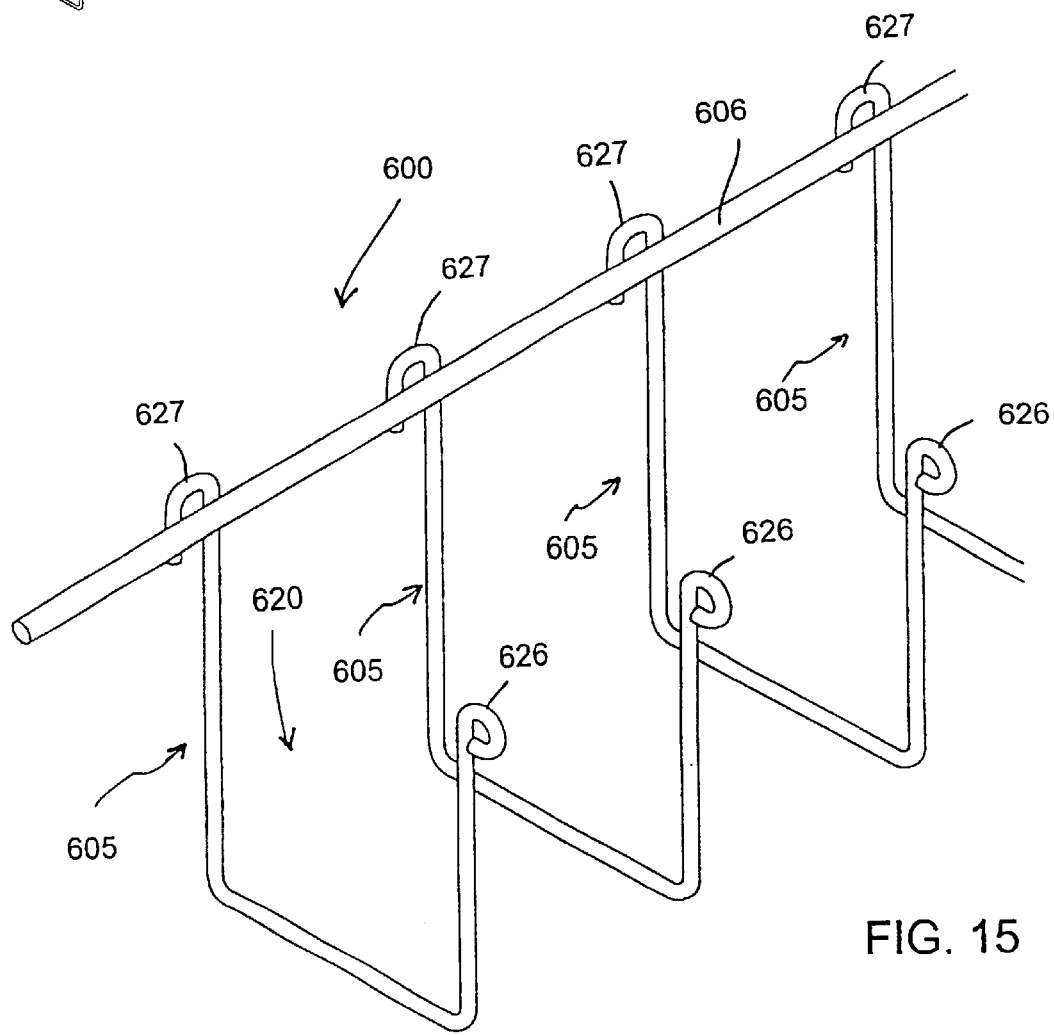
FIG. 15 is an enlarged partial perspective view of the embodiment of FIG. 14.

Referring to FIGS. 14 and 15, a further alternative embodiment of the cable management system of the present disclosure is shown generally as flexible cable tray 600. Cable tray 600 is similar to the embodiment shown in FIG. 13 and described above, for cable tray 500. In particular, mounting loops 627 are formed at the attachment of cable supports 605 to spine 606. Additionally, looped ends 626 formed on the outboard vertical leg of cable supports 605, shown formed outwardly in FIGS. 14 and 15, may be reversed and formed as described above for the embodiment of cable tray 400 in order to provide the retention feature previously described.

As noted above, in the configuration of cable tray 300 of the embodiment illustrated in FIGS. 7 and 8 and described above, spine 306 is attached to cable supports 305 substantially directly over the center of gravity of the unit as a whole. In contrast, the configuration of cable tray 600 is such that spine 606 is substantially in vertical alignment with the inboard side of the partially enclosed cable receiving and retaining portion 620. In this manner, cable tray 600 may be readily attached to vertical surfaces by any suitable attachment hardware either by utilizing mounting loops 627 or by direct attachment of spine 606.

Although the illustrative embodiments of the present disclosure have been described herein with reference to the accompanying drawings, it is to be understood that the disclosure is not limited to those precise embodiments, and that various other changes and modifications may be affected therein by one skilled in the art without departing from the scope or spirit of the disclosure. All such changes and modifications are intended to be included within the scope of the disclosure as defined by the appended claims.

What is claimed is:

1. A cable support apparatus, which comprises:
   an elongate flexible spine member selectively bendable into a number of different configurations;
   a plurality of support members attached to the elongate flexible spine member along the length thereof, the plurality of support members positioned relative one another to permit substantial bending by hand of the elongate flexible spine member, the plurality of support members each defining a partially enclosed area configured and dimensioned to receive a plurality of cables therein; and
   a mounting terminal formed adjacent a juncture between at least one of the plurality of support members and the elongate flexible spine member, the mounting terminal configured and dimensioned to cooperate with hardware so as to facilitate mounting the cable support apparatus to a structure positioned above the cable support apparatus.

2. The cable support apparatus of claim 1, wherein the mounting terminal is formed as a loop adapted to receive mounting hardware therein.

3. The cable support apparatus of claim 1 at least some of the plurality of support members define two partially enclosed areas disposed below the flexible spine member and being configured and dimensioned to receive a plurality of cables therein.

4. The cable support apparatus of claim 3 wherein the flexible spine member is positioned along a plane located centrally between the two partially enclosed areas.

5. The cable support apparatus of claim 1, wherein the flexible spine member is disposed substantially vertically aligned with the center of gravity of the cable support apparatus.

6. The cable support apparatus of claim 1 wherein the plurality of support members are attached to the flexible spine member such that an opening is defined which provides access to the at least one area, the opening being disposed a vertical distance away from the flexible spine member to permit loading or unloading of cables on the cable support apparatus when the cable support apparatus is mounted relative to a base.

7. The cable support apparatus of claim 1 wherein the plurality of support members are attached to the flexible spine member such that the flexible spine member is maintained at a predetermined distance away from the at least one area of each of the plurality of support members.

8. A cable support apparatus, which comprises:
   an elongate flexible spine member selectively bendable into different configurations;
   a plurality of support members, each including an inboard leg portion, an outboard leg portion, and an intermediate portion extending between the inboard and outboard leg portions and defining a partially enclosed area configured and dimensioned to receive a cable below the elongate flexible spine member, the plurality of support members attached at the inboard leg portion to the elongate flexible spine member along the length thereof relative one another to permit substantial bending by hand of the elongate flexible spine member; and
   a mounting terminal formed adjacent a juncture between at least one of the plurality of support members and the elongate flexible spine member, the mounting terminal configured and dimensioned to cooperate with hardware so as to facilitate mounting the cable support apparatus to a structure positioned above the cable support apparatus.

9. The cable support apparatus of claim 8, wherein the mounting terminal is formed as a loop adapted to receive mounting hardware therein.

* * * * *